Patented Jan. 24, 1928.

1,657,420

UNITED STATES PATENT OFFICE.

JOHN THOMAS AND ARTHUR HUGH DAVIES, OF CARLISLE, ENGLAND, ASSIGNORS TO SCOTTISH DYES, LIMITED, OF CARLISLE, CUMBERLAND, ENGLAND.

PRODUCTION OF ALPHA-AMINO ANTHRAQUINONES.

No Drawing. Application filed July 20, 1921, Serial No. 486,249, and in Great Britain July 23, 1920.

This invention relates to the production of dyestuff intermediates and particularly of amino-anthraquinones.

The usual method for the production of 2-amino-anthraquinone is by autoclaving the sodium salt of anthraquinone-2-sulphonic acid, commonly known as "silver salt" with aqueous ammonia. If the same method is used for the preparation of 1-amino-anthraquinone the yields are considerably lower and the product is of an inferior quality.

The present invention is based upon the observation that 1-amino-anthraquinone ($\alpha$ amino-anthraquinone) of good quality can be obtained by autoclaving 1-chloranthraquinone ($\alpha$ chlor-anthraquinone) with aqueous ammonia and upon the further observation that while if anthraquinone-disulphonates are autoclaved with ammonia the yields generally tend to be unsatisfactory, by autoclaving the dichloranthraquinones with ammonia the corresponding diamino-compound can be obtained with perfectly satisfactory results.

The invention consists broadly in producing amino-anthraquinone by autoclaving with ammonia halogen derivatives of anthra-quinone in which only hydrogens in the $\alpha$ position in the aromatic nucleus are substituted and such hydrogens are substituted by halogen atoms.

The invention also comprises the employment of copper in the form, for instance, of a salt of copper for promoting the desired reaction.

The following particulars are given by way of example in order to illustrate a suitable manner of carrying the invention into effect.

100 parts of 1-chloranthraquinone ($\alpha$-chlor-anthraquinone) are heated with 700 parts of 26% ammonia to 170° C. for twelve hours. The vessel is then allowed to cool and the product worked up in the usual way. The yield of $\alpha$-amino-anthraquinone approaches the theoretical, and the quality is excellent. The presence of small amounts of copper salts seems to have a slightly beneficial effect on the reaction.

Having now described our invention, what we claim as new and desire to secure by Letters Patent is:—

1. The process of producing amino-anthraquinones which comprises autoclaving with ammonia halogen derivatives of anthraquinone in which only hydrogens in the $\alpha$ position in the aromatic nucleus are substituted and such hydrogens are substituted by halogen atoms.

2. The process of producing amino-anthraquinones which comprises autoclaving with ammonia and copper compounds halogen derivatives of anthraquinone in which only hydrogens in the $\alpha$ position in the aromatic nucleus are substituted and such hydrogens are substituted by halogen atoms.

3. The process of producing amino-anthraquinones which comprises autoclaving with ammonia chlorine derivatives of anthraquinone in which only hydrogens in the $\alpha$ position in the aromatic nucleus are substituted and such hydrogens are substituted by chlorine atoms.

4. The process of producing amino-anthraquinones which comprises autoclaving with ammonia and copper compounds chlorine derivatives of anthraquinone in which only hydrogens in the $\alpha$ position in the aromatic nucleus are substituted and such hydrogens are substituted by chlorine atoms.

5. The process of producing $\alpha$-amino-anthraquinone which comprises autoclaving with ammonia $\alpha$-chlor-anthraquinone.

6. The process of producing $\alpha$-amino-anthraquinone which comprises autoclaving with ammonia and a copper compound $\alpha$-chlor-anthraquinone.

In testimony whereof we have signed our names to this specification.

JOHN THOMAS.
ARTHUR HUGH DAVIES.